(12) United States Patent
Salvia, III et al.

(10) Patent No.: US 10,059,237 B2
(45) Date of Patent: Aug. 28, 2018

(54) VEHICLE SEAT ARMREST WITH RETRACTABLE ARM SUPPORT PORTION

(71) Applicant: Toyota Motor Engineering & Manufacturing North America, Inc., Erlanger, KY (US)

(72) Inventors: John J. Salvia, III, Ann Arbor, MI (US); Christopher M. Vargo, Plymouth, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 32 days.

(21) Appl. No.: 15/336,869

(22) Filed: Oct. 28, 2016

(65) Prior Publication Data

US 2018/0118061 A1    May 3, 2018

(51) Int. Cl.
*B60N 2/46* (2006.01)
*B60R 22/00* (2006.01)
*B60N 2/75* (2018.01)

(52) U.S. Cl.
CPC ............ *B60N 2/773* (2018.02); *B60N 2/468* (2013.01); *B60N 2/4646* (2013.01); *B60N 2/79* (2018.02)

(58) Field of Classification Search
CPC ...... B60N 2/773; B60N 2/4646; B60N 2/468; B60N 2/79
USPC ................. 297/411.35, 188.01, 481, 188.14
See application file for complete search history.

(56) References Cited

U.S. PATENT DOCUMENTS

| | | | | |
|---|---|---|---|---|
| 4,132,434 A * | 1/1979 | Takahashi | ............... | B60R 22/26 297/481 X |
| 4,643,449 A * | 2/1987 | Sasaki | ..................... | B60R 22/03 297/481 X |
| 4,679,821 A * | 7/1987 | Yamamoto | .............. | B60R 22/03 297/481 X |
| 5,332,261 A * | 7/1994 | Siepierski | ............... | B60R 22/22 297/481 X |
| 5,393,097 A * | 2/1995 | Townsend | .................. | B60J 5/06 297/481 X |
| 5,845,965 A * | 12/1998 | Heath | .................... | B60N 2/464 297/411.35 X |
| 6,308,986 B1 * | 10/2001 | Townsend | ............... | B60R 22/03 297/481 X |
| 6,419,314 B1 | 7/2002 | Scheerhorn | | |
| 6,719,367 B2 * | 4/2004 | Mic | ...................... | B60N 2/4646 296/37.8 |
| 6,796,591 B2 * | 9/2004 | Yanagita | ................ | B60N 3/102 296/24.34 |

(Continued)

*Primary Examiner* — Rodney B White
(74) *Attorney, Agent, or Firm* — Christopher G. Darrow; Darrow Mustafa PC

(57) ABSTRACT

A vehicle seat includes a seat base and a seatbelt buckle coupled to the seat base. An armrest is coupled to the seat base. The armrest includes a retractable arm support portion movable to positions between, and including, a retracted position and a fully extended position. The armrest is structured and coupled to the seat base such that, when the buckle is at a maximum forward position of the buckle and the retractable arm support portion is in the retracted position, a first plane extending perpendicular to a fore-aft axis of the seat and through a forward-most portion of the buckle is rearwardly spaced apart from a second plane extending parallel to the first plane and through a rear-most portion of the retractable arm support portion.

17 Claims, 10 Drawing Sheets

(56) References Cited

U.S. PATENT DOCUMENTS

| | | | | |
|---|---|---|---|---|
| 7,114,772 | B2* | 10/2006 | Kobayashi | B60N 2/206 297/188.04 |
| 7,192,070 | B2* | 3/2007 | Radu | B60N 2/4606 296/24.34 X |
| 7,278,681 | B2* | 10/2007 | Lilov | B60N 2/4646 297/188.01 X |
| 7,416,235 | B2* | 8/2008 | Rajappa | B60R 7/04 296/24.34 |
| 7,445,261 | B2* | 11/2008 | Joler | B60R 7/04 296/24.34 |
| 7,770,953 | B2* | 8/2010 | Koarai | B60N 2/4606 296/24.34 |
| 7,770,954 | B2* | 8/2010 | D'Alessandro | B60R 7/04 296/24.34 |
| 7,914,045 | B2* | 3/2011 | Messner | B60R 22/12 297/481 X |
| 7,967,339 | B2* | 6/2011 | Usoro | B60R 22/03 297/481 X |
| 8,162,369 | B2* | 4/2012 | Tsuda | B60N 2/4646 296/24.34 |
| 8,235,442 | B2* | 8/2012 | Spitler | B60R 7/04 296/24.34 |
| 8,414,081 | B2* | 4/2013 | Downey | B60N 2/206 297/481 |
| 8,454,071 | B2* | 6/2013 | Stoia | B60N 2/4646 296/1.09 |
| 8,684,469 | B2* | 4/2014 | Fukuzawa | B60R 22/26 297/481 X |
| 9,022,466 | B2* | 5/2015 | Cinco | B60N 2/4686 297/411.35 X |
| 2006/0181073 | A1* | 8/2006 | Sugiyama | B60R 22/03 297/481 X |
| 2012/0242115 | A1* | 9/2012 | Schreiber | B60N 2/24 297/188.01 X |
| 2014/0132056 | A1* | 5/2014 | Yilma | B60R 22/20 297/481 |
| 2015/0175040 | A1* | 6/2015 | Meszaros | B60N 2/305 297/188.01 |

* cited by examiner

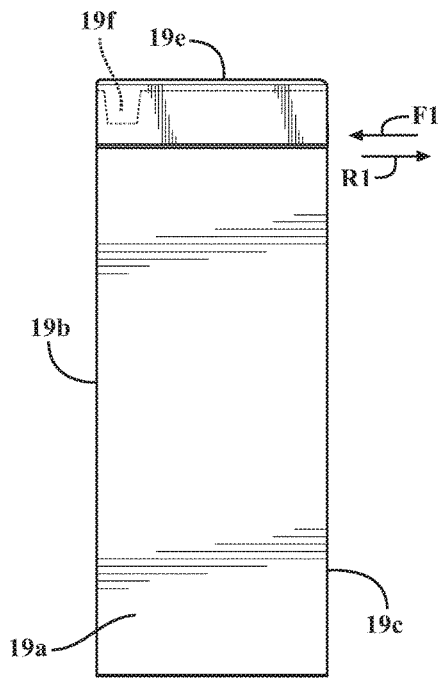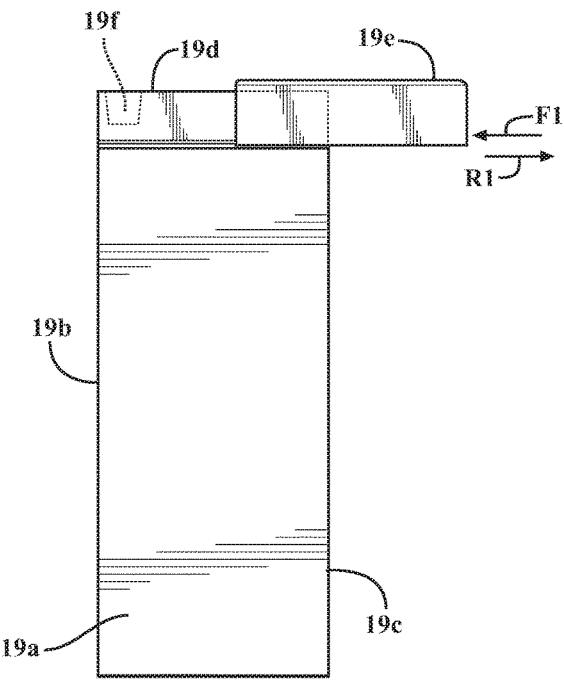
FIG. 4A  FIG. 4B
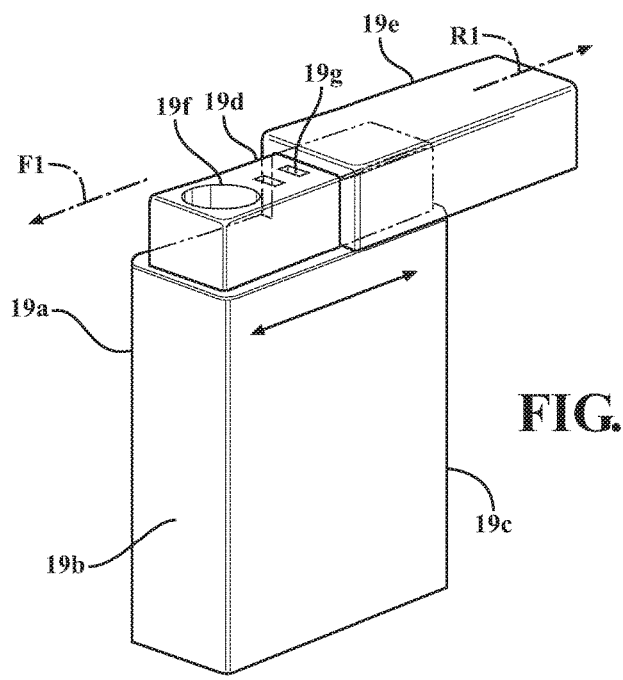
FIG. 5

VEHICLE SEAT ARMREST WITH RETRACTABLE ARM SUPPORT PORTION

TECHNICAL FIELD

The embodiments described herein relate to vehicle seats and, more particularly, to rear passenger's seats having armrests.

BACKGROUND

A fixed armrest may be incorporated into a vehicle seat (for example, on a rear passenger seat of a minivan) to provide a vehicle occupant with a "business class" look and feel. However, a fixed armrest may reduce hand space available for accessing a seatbelt buckle. In addition, attachment of a child seat to the rear seat may further reduce the available access space.

SUMMARY

In one aspect of the embodiments described herein, a vehicle seat is provided. The vehicle seat includes a seat base and a seatbelt buckle coupled to the seat base. An armrest is coupled to the seat base. The armrest includes a retractable arm support portion movable to positions between (and including) a retracted position and a fully extended position. The armrest is structured and coupled to the seat base such that, when the buckle is at a maximum forward position of the buckle and the retractable arm support portion is in the retracted position, a first plane extending perpendicular to a fore-aft axis of the seat and through a forward-most portion of the buckle is rearwardly spaced apart from a second plane extending parallel to the first plane and through a rear-most portion of the retractable arm support portion.

In another aspect of the embodiments described herein, an armrest for a vehicle seat is provided. The armrest includes a base portion structured for attachment to the seat. The base portion includes a first arm support portion and a retractable arm support portion coupled to the first arm support portion so as to be movable in a rearward direction of the seat with respect to the first arm support portion, to positions between and including a retracted position and a fully extended position.

BRIEF DESCRIPTION OF THE DRAWINGS

FIG. 4A is a side view of an armrest in accordance with an embodiment described herein, showing a retractable arm support portion in its retracted position.

FIG. 4B is the side view of FIG. 4A showing the retractable arm support portion in its extended position.

FIG. 5 is a perspective view of a portion of an armrest in accordance with an embodiment described herein, showing a retractable arm support portion in the extended position to expose a beverage holder and media/power connection devices incorporated into the armrest.

DETAILED DESCRIPTION

Embodiments described herein relate to an armrest and a seat incorporating the armrest. The armrest is structured and incorporated into the seat so as to minimize or reduce interference with access to a seatbelt buckle portion by a seat occupant. To this end, various armrest features are positioned and/or dimensioned so as to control a minimum spacing between these features and the buckle of the seatbelt when the buckle is at a maximum forward position of the buckle.

Description follows regarding a vehicle seat according to exemplary embodiments of the present invention with reference to FIGS. 1-9. Note that in the following description, the front, back, left, right, up and down directions relating to the seat embodiments described herein indicate the front, back, left, right, up and down directions from the viewpoint of an occupant seated in the vehicle seat when it is mounted in a vehicle. Also, vertical and horizontal directions are defined with respect to a level road surface upon which the vehicle rests. That is, a horizontal direction or plane lies parallel to a level road surface upon which the vehicle rests, and a vertical direction or plane lies perpendicular to the horizontal direction or plane.

Figure 1:
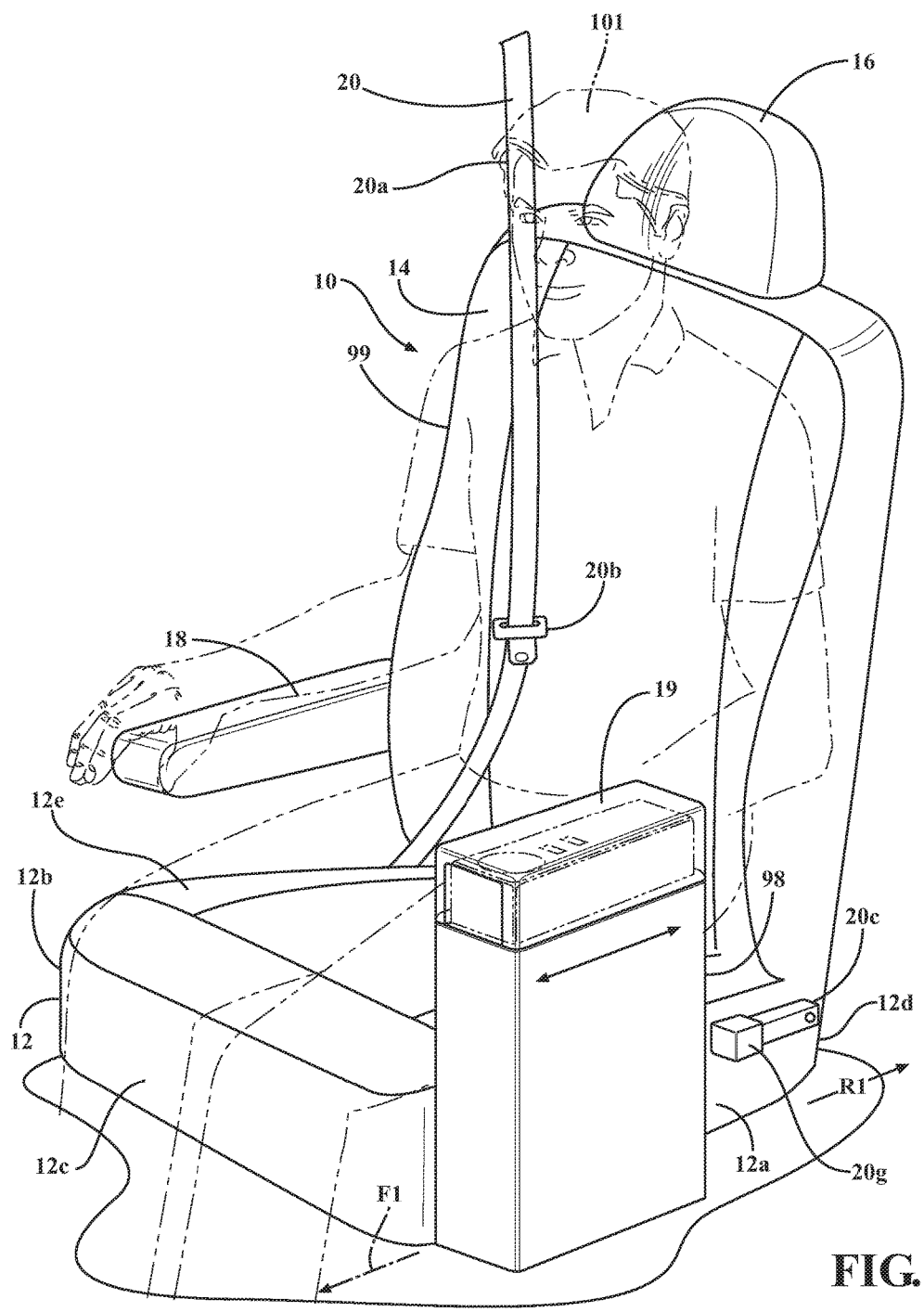
FIG. 1 is a perspective view of a vehicle seat incorporating an armrest in accordance with an embodiment described herein.
Figure 6A:
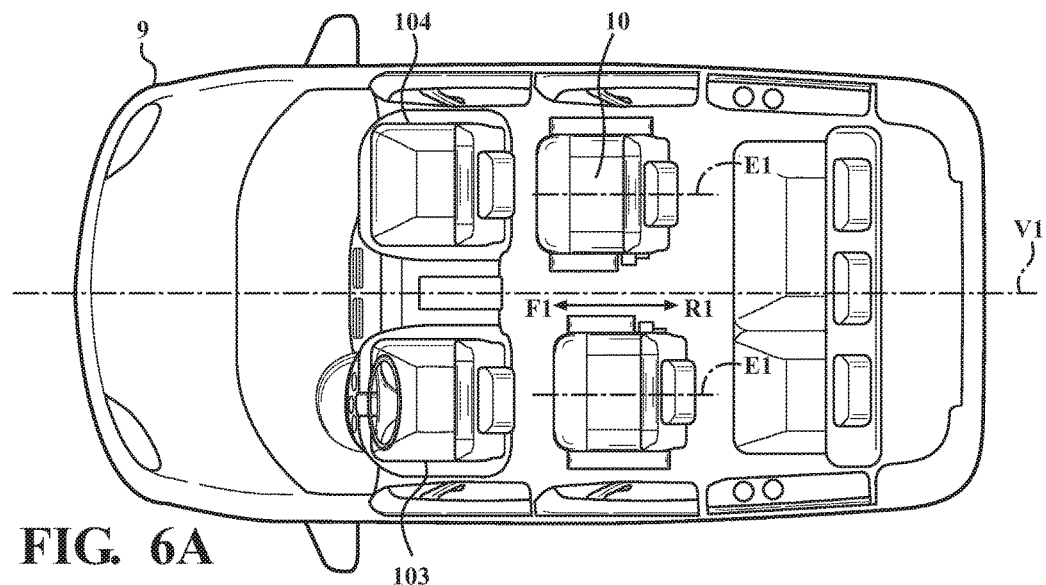
FIG. 6A is a plan schematic view of a vehicle including a seat in accordance with an embodiment described herein, with the seat facing toward a front of the vehicle.
Figure 6B:
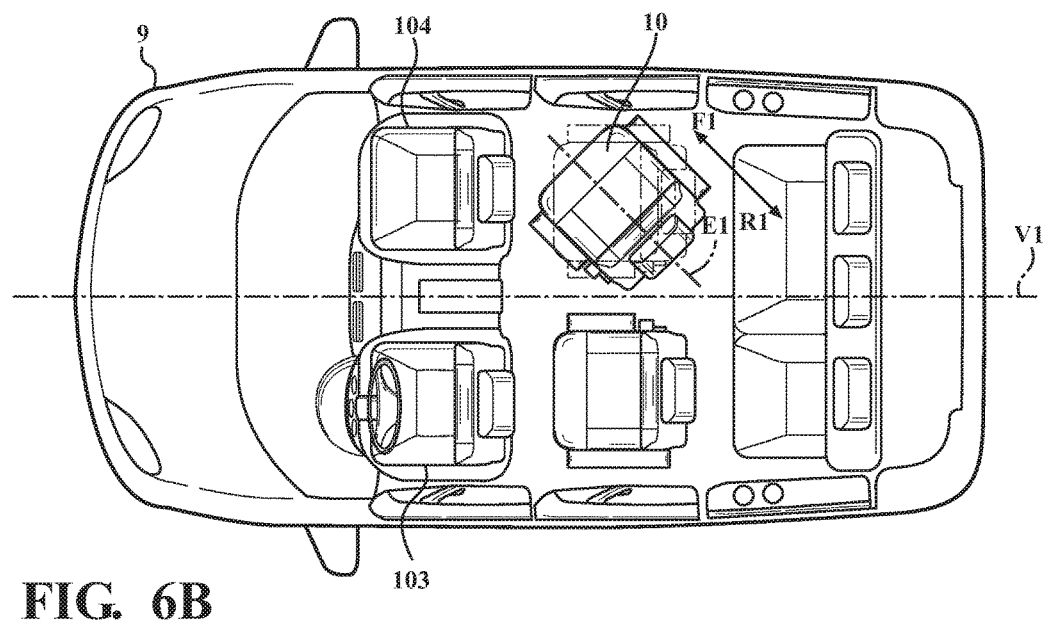
FIG. 6B is the plan schematic view of FIG. 6A showing the seat rotated in a direction away from the front of the vehicle.

FIG. 1 is a schematic perspective view of a vehicle seat 10 incorporating an armrest 19 in accordance with an embodiment described herein. FIGS. 6A and 6B are plan schematic views of a vehicle including a seat as shown in FIG. 1. Referring to FIGS. 1, 6A, and 6B, the vehicle seat 10 may be a rear passenger's seat disposed behind the front seats (i.e., driver's seat 103 and front passenger seat 104) of a vehicle 9, for example, a minivan. In the embodiment shown, the vehicle seat 10 includes a seat base 12 structured for supporting the buttocks and thighs of the seat occupant, a seat back 14 that supports the upper body of the occupant, and a headrest 16 that supports the head of the occupant. The vehicle seat 10 may also be equipped with a pair of armrests 18 and 19. The seat back 14 and headrest 16 may be covered with pads formed from urethane foam or any other suitable cushioning material.

Figure 1A:
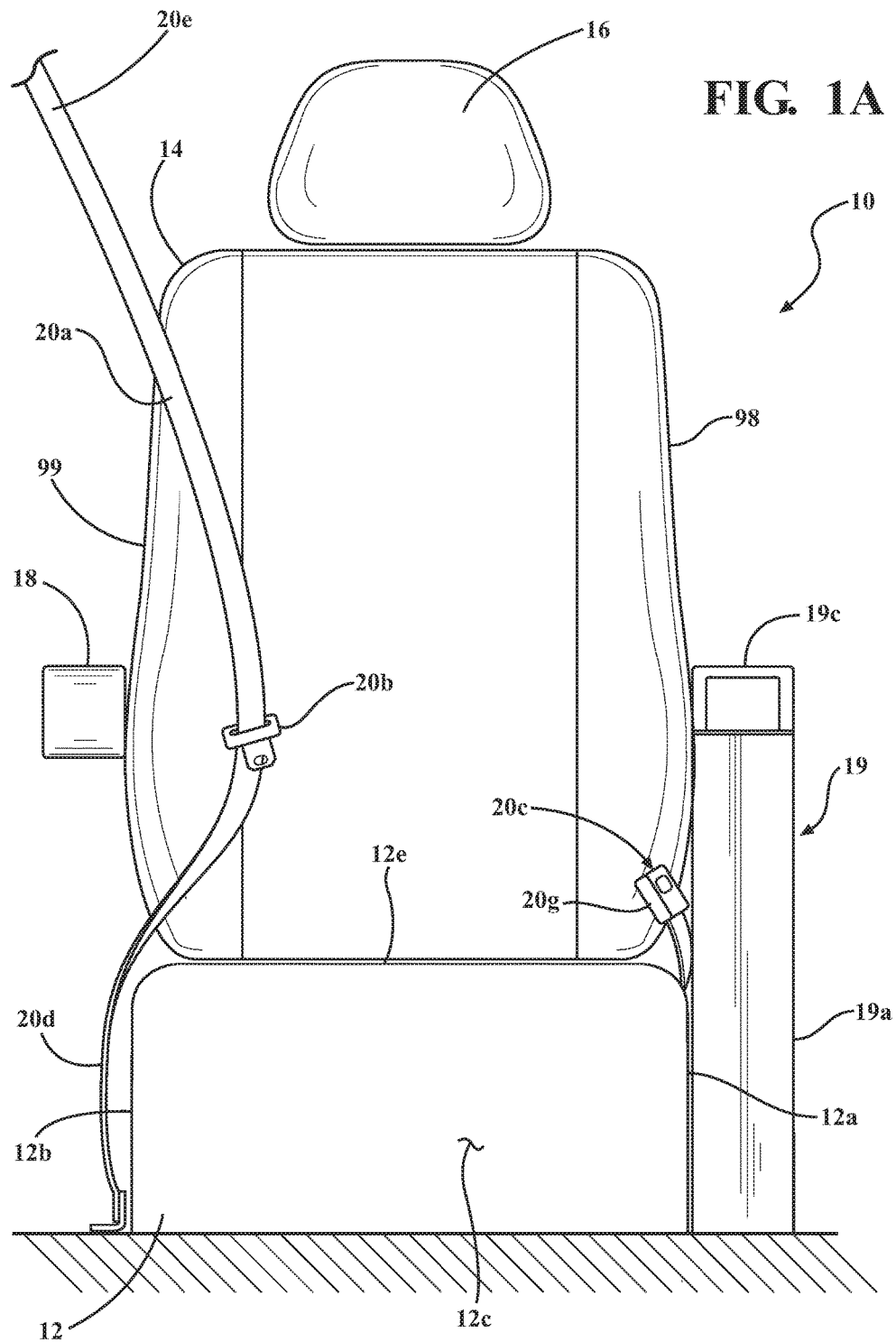
FIG. 1A is a frontal view of the seat embodiment shown in FIG. 1.

Referring to FIGS. 1 and 1A, seat base 12 has a left side 12a, a right side 12b, a front side 12c, and a rear side 12d.

The front side 12c of the seat base is considered to be a side along which a seat occupant's legs extend when the occupant is seated during normal use of the seat. Seat base 12 also has a top surface 12e which may be structured for supporting the buttocks and thighs of the seat occupant. In certain embodiments, the seat base top surface 12e may be formed (or partially formed) by a seat cushion attached to the seat base. The seat cushion may be formed from any suitable material (for example, a urethane foam). The seat cushion may be covered by a covering material formed using, for example, fabric or leather.

A seatbelt 20 may be provided for securing the seat occupant in the seat during operation of the vehicle. Seatbelt 20 may be coupled to the seat 10 by attachment to the seat 10 and/or to other portions of the vehicle in a known manner. Seatbelt 20 may include a main or belt portion 20a including a clasp 20b, and a buckle portion 20c. In the embodiment shown, the belt portion 20a is attached to the vehicle so that it resides along a right side 99 of the seat when the seatbelt 20 is in an unbuckled condition. One end 20d of the belt portion 20a may be attached to the seat 10 or to another portion of the vehicle (such as an anchor secured to a floor of the vehicle) adjacent the seat base 12. Another end 20e of the belt portion may pass through (or be supported along) an interior trim wall, the vehicle B-pillar, a door frame, or other part of the vehicle adjacent the seat 10, or to the frame structure of the seat itself, and may be connected to a known seatbelt retraction mechanism (not shown).

Figure 2A:
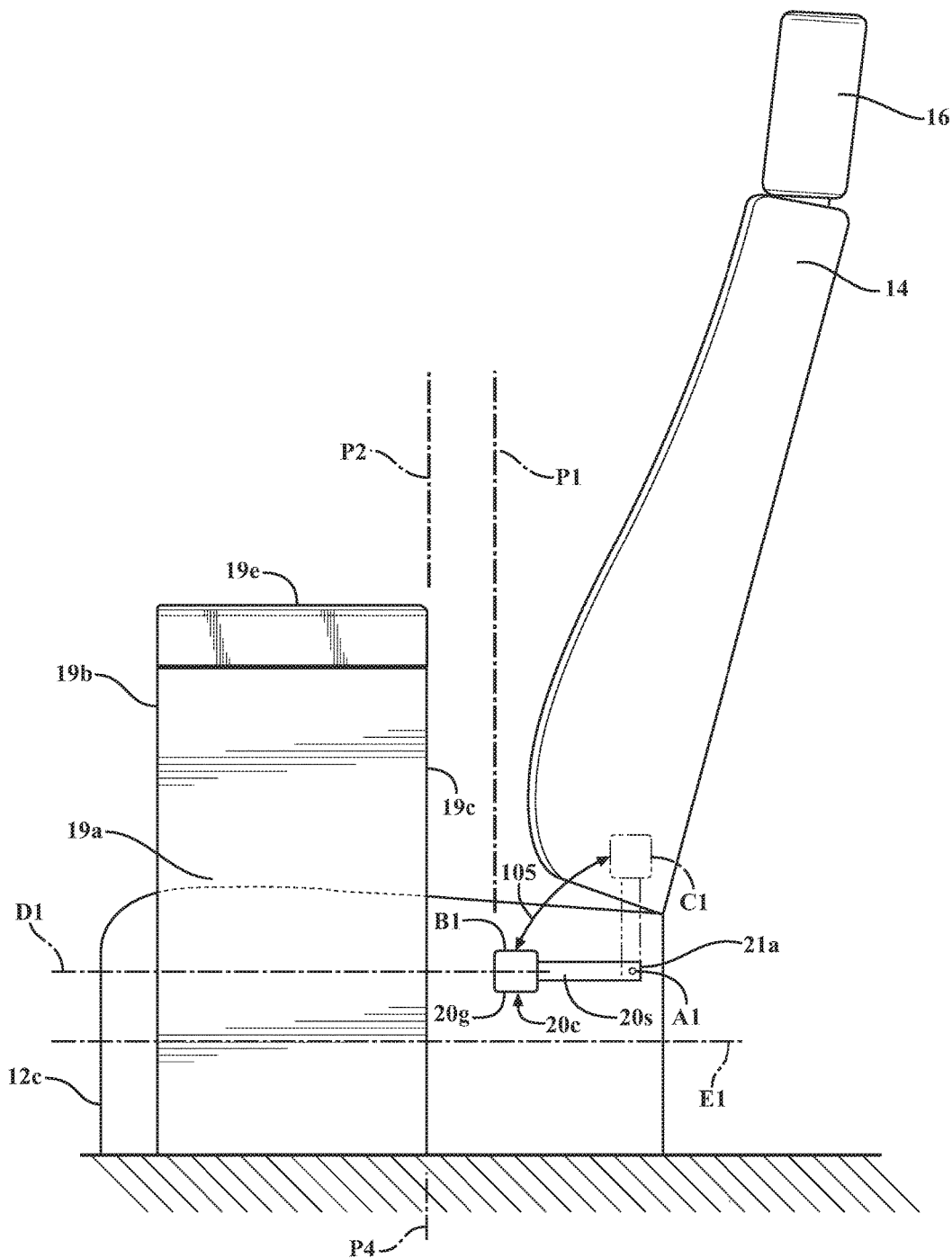
FIG. 2A is a side view of the seat of FIG. 1, showing a retractable arm support portion in accordance with an embodiment described herein, in a retracted position.
Figure 2B:
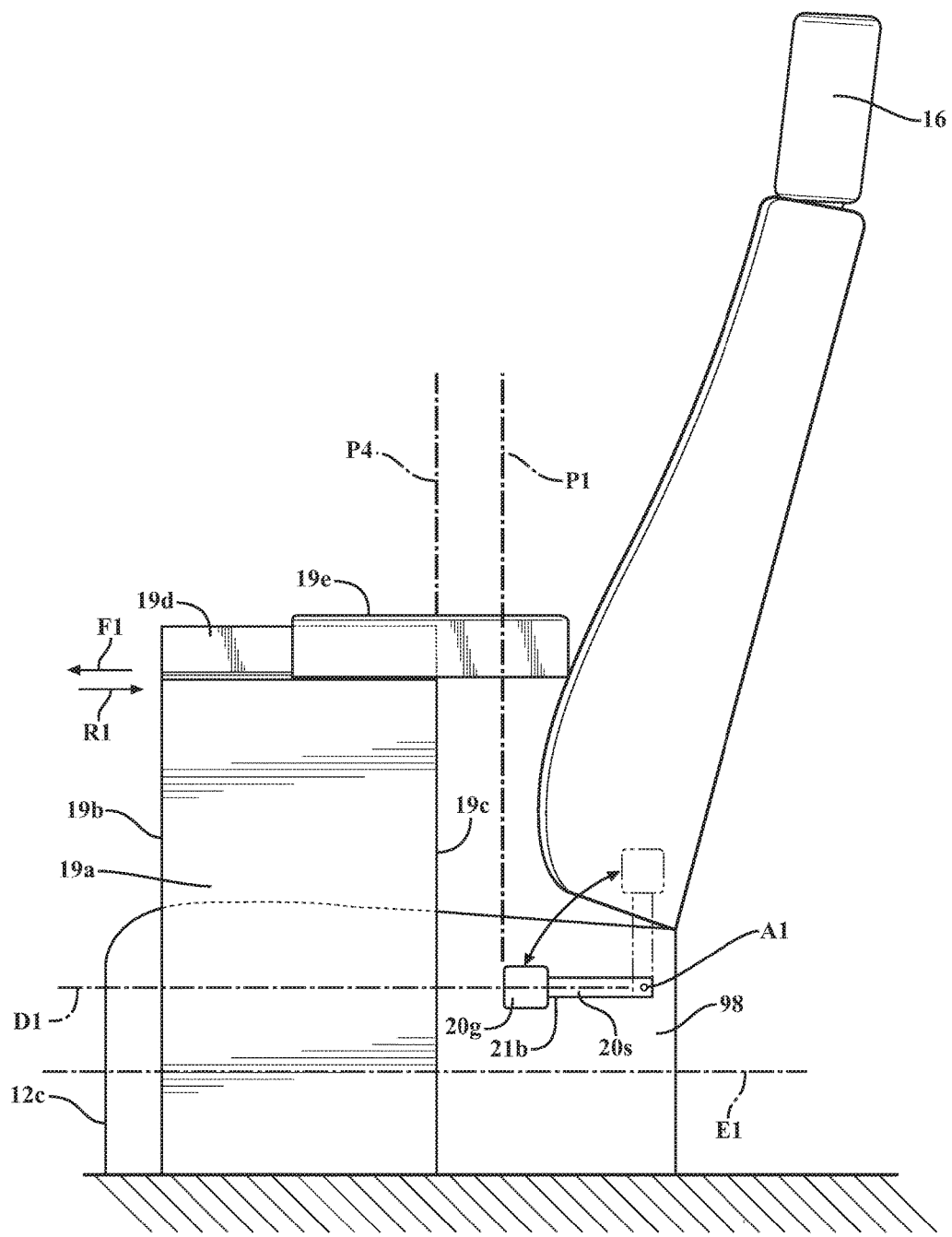
FIG. 2B is the side view of FIG. 2A, showing the retractable arm support portion in an extended position.

Referring to FIGS. 2A and 2B, in the embodiment shown, the buckle portion 20c has a strap or other attachment portion 20s and a buckle 20g. The attachment portion 20s has a first end 21a coupled to the seat base 12 and a second end 21b to which the buckle 20g is attached. In the embodiment shown, the buckle portion 20c is attached to the seat base left side 12a so that it resides along a left side 98 of the seat opposite the right side 99 when the seatbelt 20 is in an unbuckled condition. Buckle 20g is structured for engaging clasp 20b in a known manner to secure the seatbelt in a buckled condition, thereby securing the occupant in the seat during vehicle operation.

Referring to FIGS. 2A and 2B, a fore-aft axis E1 of the seat 10 is an axis passing through the seat base 12. As seen in FIGS. 2A, 2B, 6A, and 6B, the seat fore-aft axis E1 is defined such that, when the seat 10 is installed in a vehicle 9 and faces toward a front of the vehicle (in a manner similar to the driver's seat 103 and front passenger seat 104 during normal usage of the vehicle 9), the seat fore-aft axis E1 extends parallel to a fore-aft axis V1 of the vehicle. In addition, a forward direction F1 of the seat 10 and its constituent elements extends parallel to axis E1 and is a direction in which an occupant 101 faces when seated in the seat 10 and when facing toward the front side 12c of the seat base 12, as shown in FIG. 1. A rearward or rear direction R1 of the seat 10 and its constituent elements is a direction opposite of the forward direction F1. As shown in FIGS. 6A and 6B, the seat fore-aft axis E1 will rotate along with the seat 10, whether forwardly, rearwardly, or side-to-side. Also, the forward direction F1 and the rearward direction R1 of the seat 10 will follow the seat 10 as the seat rotates forwardly, rearwardly, or side-to-side.

Referring to FIGS. 1-3B, as previously mentioned, an armrest may be positioned along each side of the seat 10. In the embodiment shown, an armrest 18 is positioned along a right side 99 of the seat, and an armrest 19 is positioned along the left side 98 of the seat. Armrest 18 may be rotatably attached to an associated side of seat back 14 in a known manner so that the armrest is rotatable between a "down" or use position (shown in FIG. 1), and an "up" or stowed position (not shown).

Armrest 19 is coupled to the seat base 12. In the embodiment shown, armrest 19 includes a base portion 19a coupled to the seat base 12. The armrest base portion 19a may have a front edge 19b and a rear edge 19c positioned opposite the seatbelt buckle portion 20c. The armrest 19 may also include a first arm support portion 19d supported by the base portion 19a. Armrest 19 may also include a retractable arm support portion 19e which may be movable to either of a fully extended position (shown in FIGS. 2B, 3B, and 4B) and a retracted position (shown in FIGS. 2A, 3A, and 4A). The retractable arm support portion 19e is also movable to any position between the fully extended position and the retracted position. In the embodiment shown, the retractable arm support portion 19e is a second arm support portion coupled to the first arm support portion 19d so as to be movable with respect to the first arm support portion. The fully extended position of the retractable arm support portion 19e is the farthest rearward position of the arm support portion 19e, and the retracted position of the retractable arm support portion 19e is the farthest forward position of the arm support portion 19e.

In the embodiment shown, when in the extended position, the retractable second arm support portion 19e may act in conjunction with the first arm support portion 19d to support the arm of a seat occupant. Combined, the retractable second arm support portion 19e and the first arm support portion 19d may form an extended armrest in which different portions of the arm of a seat occupant may be supported by each of the retractable second arm support portion 19e and the first arm support portion 19d (i.e., when the retractable second arm support portion 19e is extended, the retractable second arm support portion 19e may support a first portion of the occupant's arm, while the first arm support portion 19d supports a second portion of the occupant's arm different from the first portion of the arm). In addition, the combination of the retractable second arm support portion 19e and the first arm support portion 19d enable the seat occupant's arm to be supported over a wide range of angles or orientations of seat back 14, while using an armrest which is not attached to the seat back.

The retractable second arm support portion 19e may be coupled to the first arm support portion 19d by the use of any suitable mechanism, such as tracks and/or bearings, enabling smooth movement of the second arm support portion 19e along and with respect to the first arm support portion 19d. As seen in the drawings, the retractable second arm support portion 19e may be structured to enclose or cover at least a portion of an exterior of the first arm support portion 19d when the second arm support portion 19e is in the retracted position.

Figure 3A:
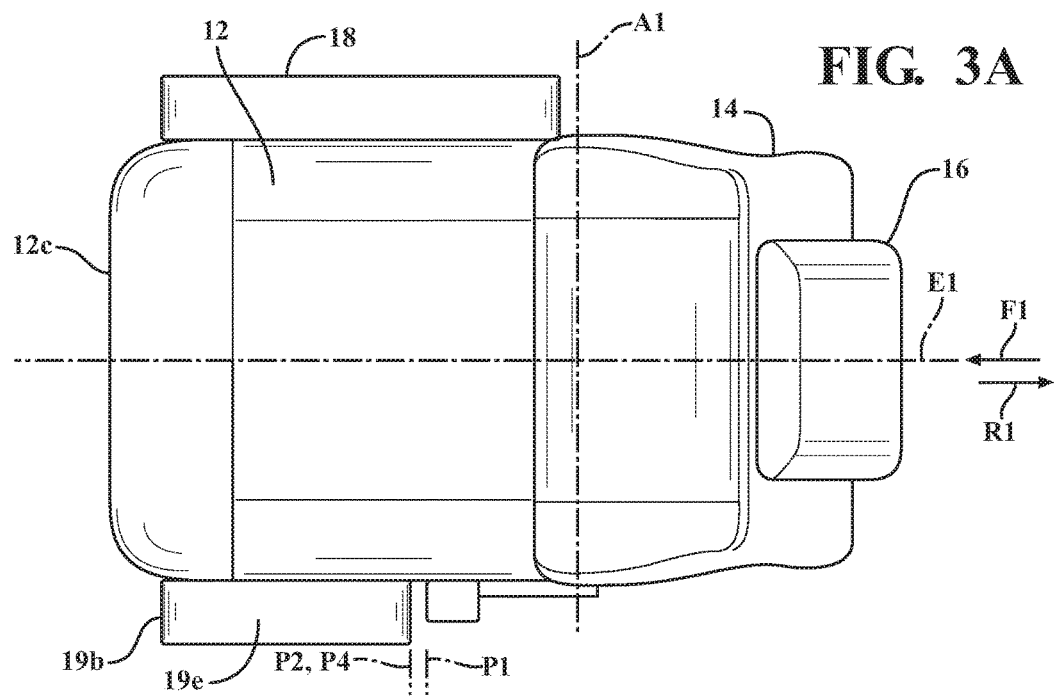
FIG. 3A is a plan view of the seat embodiment of FIG. 2A, showing the retractable arm support portion in the retracted position.
Figure 3B:
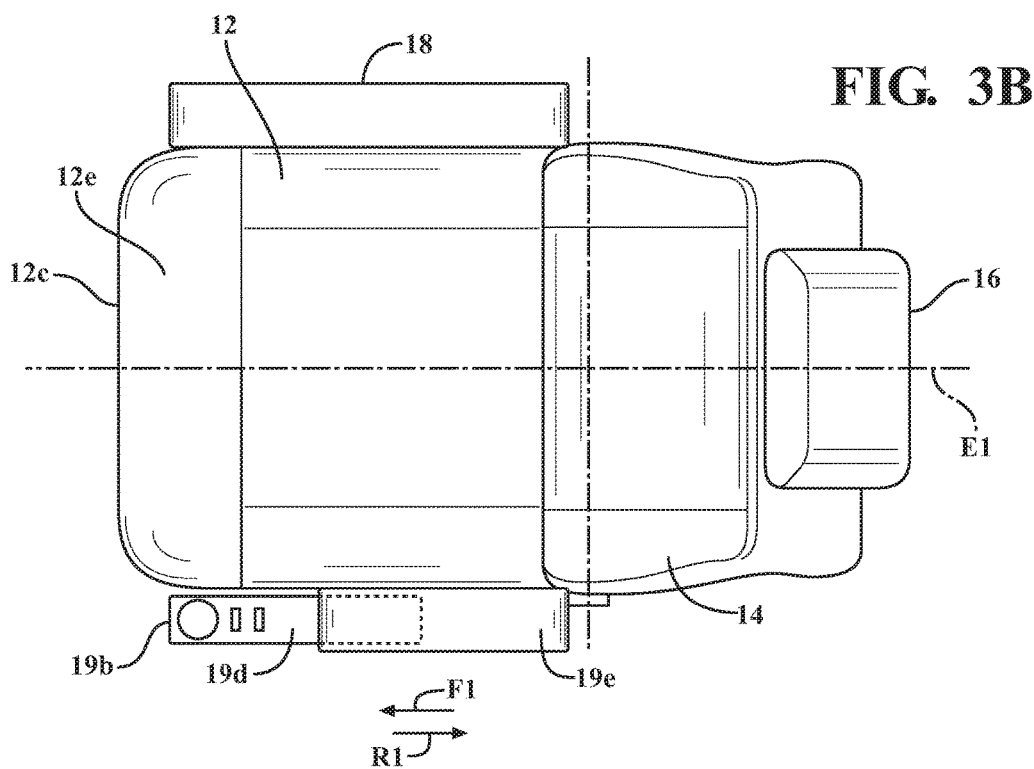
FIG. 3B is the plan view of FIG. 3A, showing the retractable arm support portion in the extended position.

In addition, referring to FIGS. 3B, 4A, 4B, and 5, the first arm support portion 19d and/or the armrest base portion 19a may incorporate a beverage holder 19f and one or more media/power connection devices 19g, such USB connectors. In particular embodiments, these features are covered by the retractable second arm support portion 19e when it is in its retracted position. The features may be exposed for use by the seat occupant when the second arm support portion 19e is fully extended as shown in FIGS. 2B, 3B and 4B. In certain embodiments, one or more of the beverage holder 19f and media/power connection devices 19g may be exposed for use when the second arm support portion 19e is only partially extended to an intermediate extended position as described in greater detail below.

Since the belt portion of a given seatbelt may be supported by the vehicle, the side of the seat 10 along which the belt portion is supported may vary with the location of the seat 10 inside the vehicle. For example, if the seat 10 is positioned along a right side of the vehicle interior, the side along which the belt portion 20a is supported may be the right side 99 of the seat, and the side of the seat along which the buckle portion 20c and the armrest 19 with the retractable arm support portion 19e reside is the left side 98 of the seat as shown in FIGS. 1 and 1A. Conversely, when the seat 10 is located along a left side of the vehicle, the side of the seat along which the belt portion 20a is supported may be the left side 98 of the seat, and the side of the seat along which the buckle portion 20c and the armrest 19 with the retractable arm support portion 19e reside may be the right side 99 of the seat.

FIG. 4A is a side view of an armrest in accordance with an embodiment described herein, showing the retractable second arm support portion 19e in a retracted position. FIG. 4B is the side view of FIG. 4A showing the retractable second arm support portion 19e in an extended position. Similarly, FIGS. 2A-2B show schematic side views of a vehicle seat 10 incorporating an armrest 19 in accordance with the armrest embodiment shown in FIGS. 4A-4B. FIG. 2A shows the retractable second arm support portion 19e in its retracted position, and FIG. 2B shows the second arm support portion 19e in a fully extended position. FIGS. 3A-3B show schematic plan views of the vehicle seat 10 of FIGS. 2A and 2B. FIG. 3A shows the retractable second arm support portion 19e in its retracted position, and FIG. 3B shows the retractable second arm support portion 19e in a fully extended position. As seen in the drawings, the retractable second arm support portion 19e is structured to be movable in a rearward direction R1 of the seat to the extended position and movable in a forward direction F1 of the seat from an extended position to the retracted position.

In embodiments of the vehicle seat described herein, the armrest 19 with the retractable second arm support portion 19e may be structured and coupled to the seat base 12 so as to minimize interference of the armrest 19 with occupant access to the seat belt buckle portion 20c, to facilitate latching and unlatching of the seatbelt. To this end, in certain embodiments, the armrest 19 may be structured and coupled to the seat base 12 such that a first plane P1 extending perpendicular to a fore-aft axis of the seat and through a forward-most portion of the buckle 20g when the buckle 20g is at a maximum forward position of the buckle is rearwardly (i.e., in a rearward direction of the seat 10) spaced apart from a second plane P2 extending parallel to the first plane and through a rear-most portion of the retractable second arm support portion 19e when the second arm support portion 19e is in its retracted position (as shown in FIGS. 2A and 3A). The maximum forward position of the buckle 20g may be defined as the forward-most position to which the buckle 20g may be moved by a seat occupant. This forward-most position of the buckle 20g may vary according to factors such as the type of attachment with which the buckle portion is coupled to the seat, the seat geometry adjacent the belt buckle 20g, the structure of the buckle portion, and other pertinent factors. For example, attachment portion first end 21a may be attached to the seat base 12 so as to enable rotation of the buckle about an axis A1 (via a shaft or rivet, for example), as shown in FIG. 2A. The buckle portion 20c may be rotatable at least between a first orientation B1 and a second orientation C1 angularly spaced apart from the orientation B1. In the first orientation B1, the buckle portion 20c extends along an axis D1 which is parallel to seat fore-aft axis E1.

In particular embodiments, an angle 105 between orientation B1 and orientation C1 encompasses at least 90 degrees. In embodiments described herein, the rotatability or positionability of the buckle portion 20c is designed to allow adjustment of the buckle orientation with respect to the belt portion clasp position, according to the size of a particular occupant. The rotatability or positionability also enables the position of the buckle 20g to adjust to changes in the orientation of the seat occupant as the occupant adjusts the seat back 14 to more forward or rearward orientations. To buckle the seatbelt, the clasp 20b of the belt portion 20a is brought in a known manner from the right side 99 of the seat 10 across the torso of a seated occupant toward the left (or buckle) side 98 of the seat, and is then attached to buckle 20g to secure the occupant in the seat.

In an embodiment such as that shown in FIGS. 2A and 2B, where the buckle portion 20c is coupled to the seat 10 such that the entire buckle portion 20c is rotatable about an axis A1, the forward-most position of the buckle 20g may be as shown in FIGS. 2A and 2B, with the buckle portion 20c rotated so as to extend along an axis D1 which is parallel to the fore-aft axis E1 of the seat 10.

Figure 8:
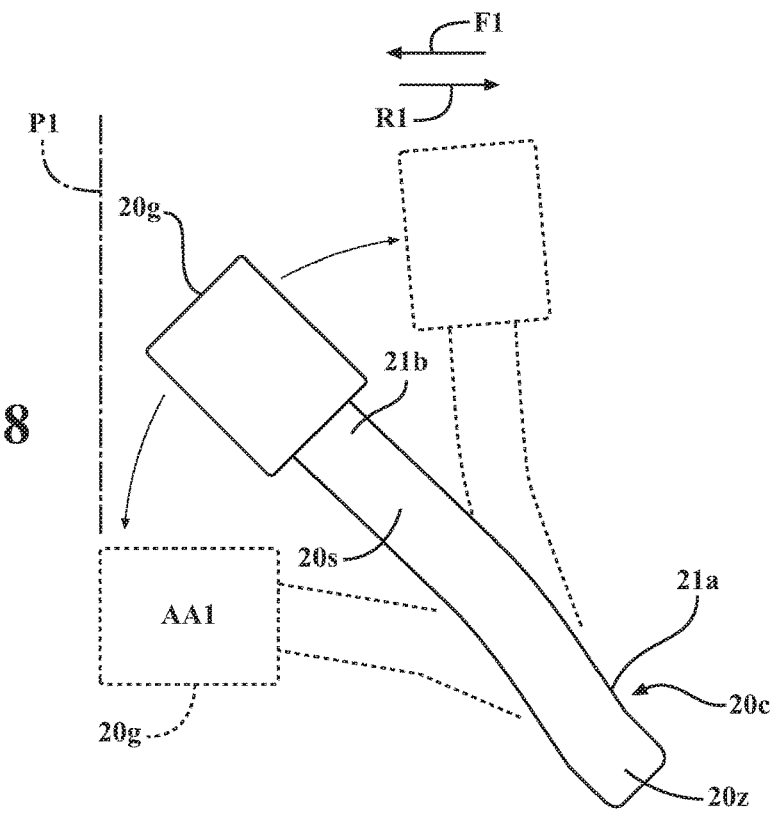
FIG. 8 is a schematic side view illustrating a mode of movement and a range of movement of a buckle portion of one embodiment of a buckle portion of a seatbelt attached to a vehicle.

In an alternative embodiment such as that shown in FIG. 8, in which the buckle portion 20c has limited rotatability about the actual attachment location 20z of attachment portion 20s to the seat 10, but the attachment portion 20s itself is flexible or bendable, the forward-most position of the buckle 20g may be a position AA1 as shown in FIG. 8, which may be achieved by moving the buckle 20g so as to bend the attachment portion 20s.

Figure 9:
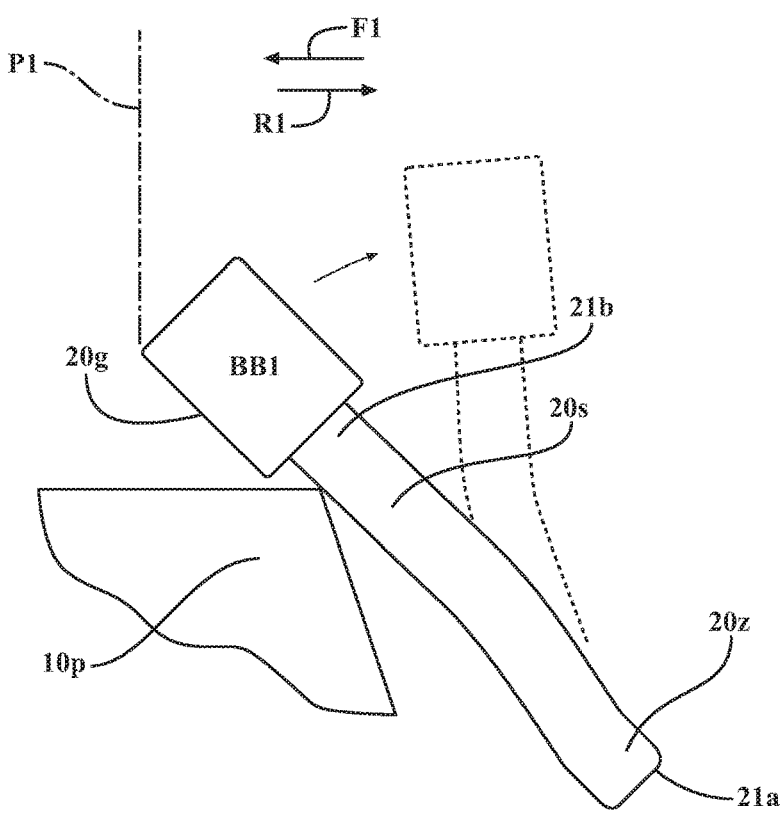
FIG. 9 is a schematic side view illustrating a mode of movement and a range of movement of a buckle portion of another embodiment of a buckle portion of a seatbelt attached to a vehicle.

In another alternative embodiment such as that shown in FIG. 9, in which forward rotation of the buckle portion 20c or forward movement of the buckle 20g is restricted by a portion 10p of the seat 10 or by another portion of the vehicle, the forward-most position of the buckle 20g may be a position BB1 as shown in FIG. 9, which may be achieved by moving the buckle 20g so as to bend or rotate the attachment portion 20s.

Although for purposes of description, the forward-most position of the buckle 20g may be described in terms of a buckle portion structured and connected to the vehicle as shown in FIGS. 2A and 2B, in which the entire buckle portion is rotatable about an axis, it will be understood that the forward-most position of the buckle may vary as just described, and that the location of the retractable arm support portion 19e needed to provide the spacing described herein when the arm support portion is in the retracted position may be adjusted accordingly.

In the embodiments described herein, an occupant of the seat 10 may increase the space available to access the buckle 20g by simply retracting the second arm support portion 19e to the position shown in FIGS. 2A and 3A. In a particular embodiment, the spacing between the first plane P1 and the second plane P2 is at least 20 millimeters. It has been found that a minimum spacing of 20 millimeters between the first plane P1 and various planes P2, P3, P4 defined by portions of the armrest 19 as described herein, is desirable to help minimize interference of the armrest with access to the buckle 20g.

The retractable second arm support portion 19e may be retracted (as shown in FIGS. 2A and 3A) to provide enhanced access to the seat belt buckle 20g and buckle portion 20c. After the seat belt 20 has been latched, the retractable second arm support portion 19e may be extended (as shown in FIGS. 2B and 3B) by rearward movement with respect to the first arm support portion 19d, for use by a seat occupant.

Also, the armrest 19 may also be structured and coupled to the seat base 12 such that, when the buckle 20g is at a maximum forward position of the buckle, the first plane P1 is rearwardly spaced apart from another plane P4 extending parallel to the first plane and through a rear-most portion of the first arm support portion 19d, as shown in FIG. 2B. This aids in minimizing interference of the armrest first arm support portion 19d with occupant access to seatbelt buckle 20g. In a particular embodiment, the spacing between the first plane P1 and the fourth plane P4 is at least 20 millimeters.

In certain embodiments, as shown in FIGS. 2A, 3A, and 4A, the plane P4 extending through a rear-most portion of the first arm support portion 19d and the plane P2 extending through a rear-most portion of the retractable second arm support portion 19e are coplanar when the second arm support portion 19e is in its retracted position.

In addition, the armrest 19 may be structured and coupled to the seat base 12 such that, when the buckle 20g is at a maximum forward position of the buckle, the first plane P1 is rearwardly spaced apart from the armrest base portion rear edge 19c. In a particular embodiment, a minimum spacing between the first plane P1 and the armrest base portion rear edge 19c is at least 20 millimeters. This aids in minimizing interference of the armrest rear edge 19c with occupant access to seatbelt buckle 20g.

In certain embodiments, as shown in FIGS. 2A, 3A, and 4A, the armrest base portion rear edge 19c is structured to extend along a plane P4, and the second plane P2 and the plane P4 extending through the armrest base portion rear edge 19c are coplanar when the retractable second arm support portion 19e is in the retracted position.

Thus, the portions of the armrest 19 described above may be structured and positioned with respect to the seatbelt buckle 20g so as to provide at least a minimum clearance between the buckle 20g and the armrest 19. This helps ensure convenient and comfortable user access to the seatbelt buckle 20g during latching and unlatching of the seatbelt 20.

Figure 7A:
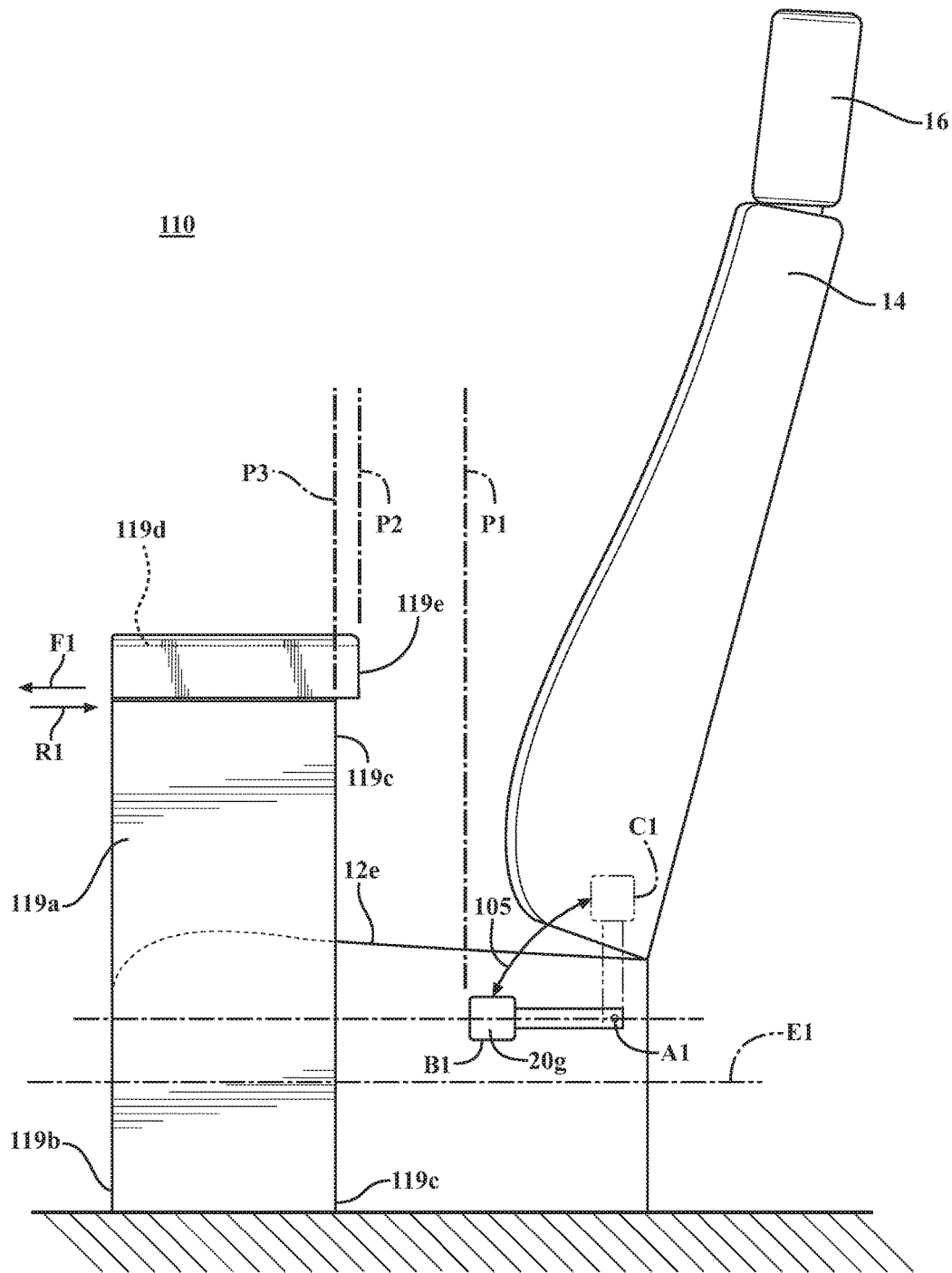
FIG. 7A is a side view of a seat incorporating an armrest in accordance with another embodiment described herein, with a retractable arm support portion in a retracted position.
Figure 7B:
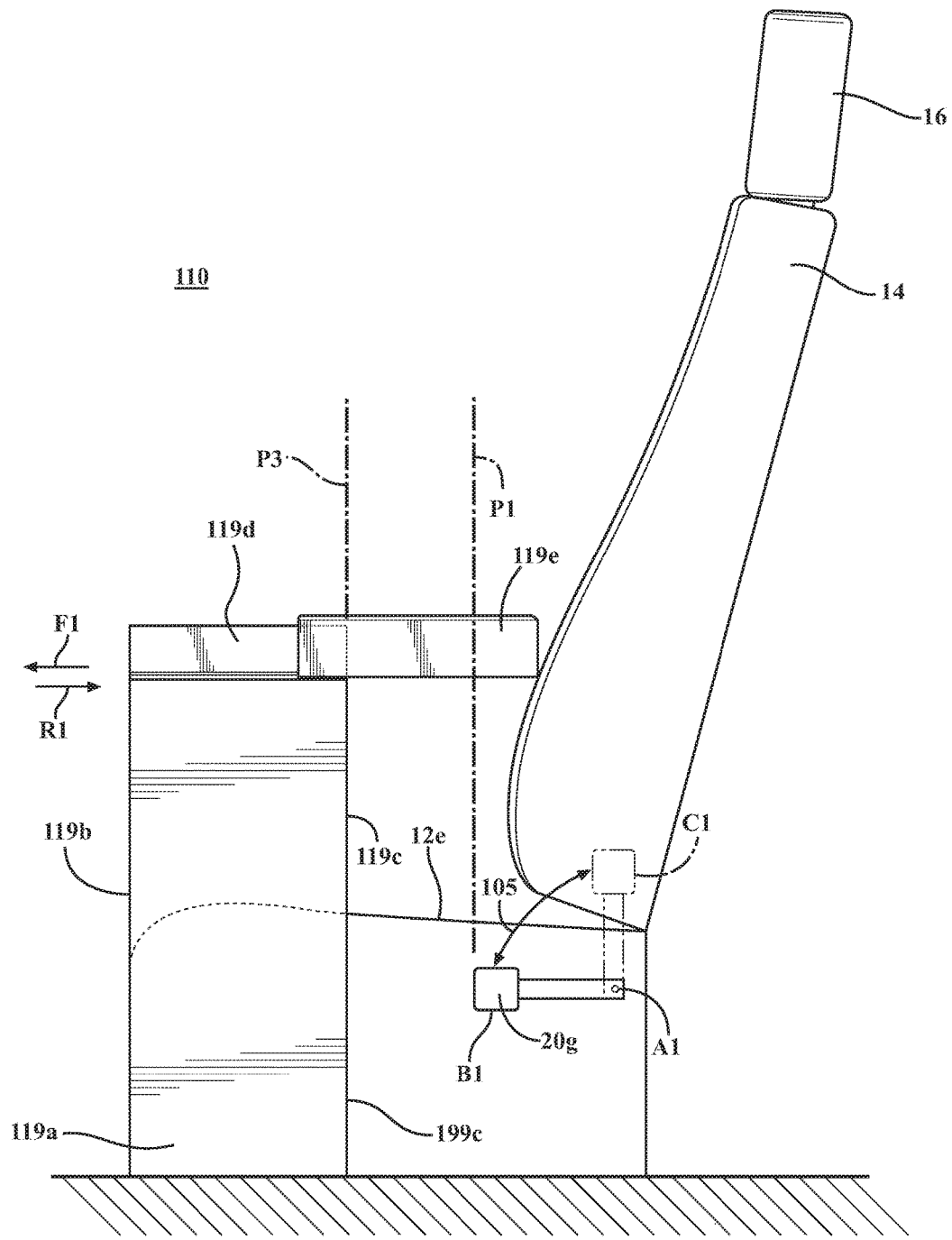
FIG. 7B is the side view of FIG. 7A, showing the retractable arm support portion in an extended position.

Referring to FIGS. 7A and 7b, in particular embodiments, the distance between the front edge 119b and rear edge 119c of armrest base portion 119a may be controlled to further increase available space surrounding seatbelt buckle 20g. In this case, as shown in FIG. 7A, the retractable second arm support portion 119e may overhang the base portion rear edge 119c when the second arm support portion 119e is retracted. Thus, in this embodiment, a spacing between the first plane P1 and the second plane P2 is less than a minimum spacing between the first plane P1 and the armrest base portion rear edge 119c. However, the plane P1 passing through the forward-most buckle portion and the plane P2 passing through the rear-most portion of the retractable second arm support portion 119e may still be spaced apart by at least a minimum predetermined distance, as previously described, to help minimize interference of the second arm support portion 119e with buckle access. In addition, the first arm support portion 119d may also overhang the base portion rear edge 119c when the retractable second arm support portion 119e is retracted. Enabling the first arm support portion 119d to extend rearwardly as far as allowable may provide a greater degree of support for the retractable second arm support portion 119e when it is extended as shown in FIG. 7B. However, the rearmost portion of the first arm support portion 119d may still be spaced from the plane P1 by at least a minimum predetermined distance, as previously described.

If desired, in the embodiments described herein, a positional securement mechanism may be provided for securing the retractable second arm support portion 19e in any position of a plurality of intermediate extended positions between the fully extended position and the retracted position, depending on the needs of the seat occupant. For example, depending on how far back the seat back 14 is positioned, the occupant may need to extend the retractable second arm support portion 19e either more or less rearwardly in order to obtain the desired degree of arm support. In one example, a plurality of detents (not shown) may be structured for engaging the second arm support portion 19e during movement of the second arm support portion. Each detent may be structured to releasably maintain the retractable second arm support portion 19e in an associated predetermined intermediate extended position between the retracted position and the fully extended position. In a particular example, the detent mechanism is in the form of a small projection formed along one of the first arm support portion 19d and the retractable second arm support portion 19e, and a series of complementary spaced-apart dimples or cavities extending coaxially along the other one of the first arm support portion 19d and the second arm support portion 19e. Each dimple may be structured to receive the projection therein as the retractable second arm support portion 19e is extended rearwardly from the first arm support portion 19d. The seat occupant may position the retractable second arm support portion 19e in (or proximate) a particular location by moving the second arm support portion 19e to (or proximate) the desired location and then slightly adjusting the position of the second arm support portion until the projection engages a dimple nearest to the projection. Any of a variety of alternative mechanisms may be used to maintain the retractable second arm support portion 19e in a desired usage position. A detent mechanism or other positional securement mechanism as described may be used with any embodiment of the retractable second arm support portion described herein.

In certain embodiments, and as shown in FIGS. 7A and 7B, the armrest is structured and coupled to the seat base 12 such that the armrest base portion front edge 119b is coplanar with the seat base front side 12c or does not extend in a forward direction of the seat past the seat base front side.

The armrest base portion 19a may be integrally formed with the seat base 12. Alternatively, as shown in FIGS. 1, 4A, 4B, and 5, the armrest base portion 19a may be formed separately from the seat base 12 and attached to the seat base 12 using any suitable method, for example, welding, adhesive application, fasteners, etc.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A vehicle seat comprising:
   a seat base;
   a seatbelt buckle portion including a seatbelt buckle, the seatbelt buckle portion being pivotably coupled to the seat base and rotatable at least between a first orientation and a second orientation, the first orientation of the seatbelt buckle portion providing a maximum forward position of the seatbelt buckle; and
   an armrest coupled to the seat base, the armrest including a retractable arm support portion movable to positions between, and including, a retracted position and a fully extended position,
   wherein the armrest is structured and coupled to the seat base such that, when the seatbelt buckle is at the maximum forward position and the retractable arm support portion is in the retracted position, a first plane extending perpendicular to a fore-aft axis of the seat and through a forward-most portion of the seatbelt buckle is rearwardly spaced apart from a second plane extending parallel to the first plane and through a rear-most portion of the retractable arm support portion.

2. The vehicle seat of claim 1 wherein the armrest includes a first arm support portion and wherein the retractable arm support portion is a second arm support portion coupled to the first arm support portion so as to be movable with respect to the first arm support portion.

3. The vehicle seat of claim 2 wherein the armrest includes a base portion attached to the seat base, and wherein the first arm support portion is supported by the base portion.

4. The vehicle seat of claim 3 wherein the armrest base portion has a rear edge positioned opposite the seatbelt buckle, and wherein the armrest is structured and coupled to the seat base such that when the seatbelt buckle is in the maximum forward position, the first plane is rearwardly spaced apart from the armrest base portion rear edge.

5. The vehicle seat of claim 4 wherein a spacing between the first plane and the second plane is less than a minimum spacing between the first plane and the armrest base portion rear edge.

6. The vehicle seat of claim 4 wherein a minimum spacing between the first plane and the armrest base portion rear edge is at least 20 millimeters.

7. The vehicle seat of claim 4 wherein the armrest base portion rear edge is structured to extend along a plane parallel with the second plane, and wherein the second plane and the plane along which the armrest base portion rear edge extends are coplanar when the retractable arm support portion is in the retracted position.

8. The vehicle seat of claim 2 wherein the retractable arm support portion is structured to cover at least a portion of an exterior of the first arm support portion when the retractable arm support portion is in the retracted position.

9. The vehicle seat of claim 8 wherein the first arm support portion includes a beverage holder positioned therein, wherein the beverage holder is covered by the retractable arm support portion when the retractable arm support portion is in the retracted position, and wherein the beverage holder is exposed when the retractable arm support portion is in the fully extended position.

10. The vehicle seat of claim 8 wherein the first arm support portion includes at least one media/power connection device positioned therein, wherein the at least one media/power connection device is covered by the retractable arm support portion when the retractable arm support portion is in the retracted position, and wherein the at least one media/power connection device is exposed when the retractable arm support portion is in the fully extended position.

11. The vehicle seat claim 1 wherein the retractable arm support portion is structured to be movable in a rearward direction of the seat to the fully extended position and movable in a forward direction of the seat from an extended position to the retracted position.

12. The vehicle seat of claim 1 wherein the armrest is structured and coupled to the seat base such that when the seatbelt buckle is in the maximum forward position, the first plane is rearwardly spaced apart from another plane extending parallel to the first plane and through a rear-most portion of the first arm support portion.

13. The vehicle seat of claim 12 wherein the plane extending through the rear-most portion of the first arm support portion and the second plane are coplanar when the second arm support portion is in the retracted position.

14. The vehicle seat of claim 12 wherein a spacing between the first plane and the plane extending through the rear-most portion of the first arm support portion is at least 20 millimeters.

15. The vehicle seat of claim 1 wherein a spacing between the first plane and the second plane is at least 20 millimeters.

16. The vehicle seat of claim 1 wherein the armrest includes a base portion coupled to the seat base and a first arm support portion supported by the base portion, wherein the retractable arm support portion is mounted on the first arm support portion so as to be movable with respect to the first arm support portion between the retracted position and the fully extended position, and wherein the armrest is structured and coupled to the seat base such that, when the seatbelt buckle is at the maximum forward position, the first plane is rearwardly spaced apart from a third plane extending parallel to the first plane and through a rear-most surface of the first arm support portion.

17. The vehicle seat of claim 16 wherein a spacing between the first plane and the third plane is at least 20 millimeters.

* * * * *